Patented Sept. 1, 1942

2,294,726

UNITED STATES PATENT OFFICE 2,294,726

STABILIZED DRY ROSIN SIZE

Arthur C. Dreshfield, Wilmington, Del., assignor to Hercules Powder Company, Wilmington, Del., a corporation of Delaware No Drawing. Application December 4, 1940,
Serial No. 368,452

6 Claims. (Cl. 106—218)

This invention relates to an improvement in rosin size and in particular concerns dry saponified rosin size compositions stabilized against atmospheric oxidation.

As is well known, rosin size may be prepared and utilized either in dry form or as a liquid or paste in admixture with water. The dry form, however, is in general deemed the most satisfactory because of its ease and economy of shipment, the type of dry rosin size prepared by spray-drying saponified or partially saponified rosin being especially desirable because of its low density and high rate of solution in water.

The dry forms of rosin size, particularly the type formed by spray-drying, however, are disadvantageous in that they have a strong tendency to oxidize and spontaneously decompose in the presence of air. Where, as is not uncommon, some free rosin is contained in the size, there is even a greater tendency to oxidize. Such oxidation, and consequent heating, is not only highly deleterious to the size itself but presents a considerable fire hazard during storage and shipment.

I have now found that dry rosin sizes comprising saponified rosin may be effectively stabilized against oxidation by the addition of a small proportion of certain amino derivatives of diphenyl- and triphenyl-methane. Dry rosin size stabilized in this manner may be stored for long periods of time without danger of decomposition by oxidation or spontaneous combustion.

The diphenyl- and triphenyl-methane derivatives which may be employed as anti-oxidants in preparing dry rosin size compositions according to the invention have the general formula

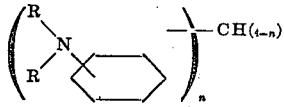

wherein R represents a lower alkyl radical, i. e., an alkyl radical containing less than five carbon atoms, and $n$ represents an integer greater than 1 but less than 4. Examples of such compounds are 4,4'-tetramethyldiamino-diphenyl-methane (Michler's hydrol), 3,3'-tetraethyldiamino-diphenyl-methane, 4,4',4''-hexamethyldiamino-triphenyl-methane, 2,2'-tetraisopropyldiamino-diphenyl-methane, etc. These compounds are well-known dye intermediates and may be prepared by reacting an N-alkylated aniline with formaldehyde or by the alkylation of o-, m-, or p-leucaniline. While any of the compounds defined by the above general formula may be employed as anti-oxidants for dry rosin size, I prefer to employ either 4,4'-tetramethyldiamino-diphenyl-methane or 4,4',4''-hexamethyltriamino-triphenyl-methane because of their availability and lower cost.

The proportion of anti-oxidant employed in preparing the stabilized dry size compositions of the invention depends upon a number of factors, among which are the particular anti-oxidant used and the degree of stabilization desired. Usually a size is considered sufficiently stabilized for all ordinary purposes if it resists oxidation for about 48 hours when subjected to an accelerated oxidation treatment known as the "Mackay test." This treatment consists in placing a sample of the stabilized size in a wire basket suspended in a water-jacketed chamber maintained at a temperature of 100° C. A small volume of air is passed continuously through the chamber for the desired length of time, during which time the temperature of the sample, which is a measure of the oxidation, is accurately determined. Dry rosin size containing no anti-oxidant will oxidize to a considerable extent, i. e., its temperature will rise considerably above 100° C., and it may even ignite and burn when subjected to this test over a period of about 48 hours, while a size stabilized according to the invention will undergo substantially no oxidation.

The optimum proportion of anti-oxidant also depends upon the composition of the size itself, a somewhat larger proportion being required for sizes containing free alkali or free rosin. Thus, for example, a neutral saponified rosin size may be rendered stable to oxidation as determined by the 48-hour Mackay test by the addition of 0.2 per cent by weight of 4,4'-tetramethyldiamino-diphenyl-methane, whereas a size containing 0.3–0.6 per cent by weight of free alkali may require the addition of 0.5 per cent by weight of 4,4'-tetramethyldiamino-diphenyl-methane to secure such a degree of stabilization. Similarly, sizes containing 10.0 per cent by weight of free rosin may require the use of 1.0 per cent by weight of the anti-oxidant to secure good stabilization. The type of dry size, i. e. whether it has been prepared from wood rosin, gum rosin, or rosin which has been heat-treated to effect partial decarboxylation, is also of influence on the proportion of anti-oxidant to be used. Thus, sizes comprising saponified gum rosin usually required a somewhat larger proportion of the anti-oxidant than the other types.

In general, however, it will be found that from about 0.2 to about 1.5 per cent of the anti-oxidant, based on the weight of rosin employed in preparing the size, will be sufficient to render any dry size substantially resistant to oxidation.

The anti-oxidant may be incorporated with the size at any convenient time during the process for the production of the size, by treatment of the size after it is produced, or by treatment of the rosin prior to its saponification. Ordinarily, however, the anti-oxidant will desirably and most effectively be added to the size during its preparation by the saponification of rosin. A particularly convenient mode of effecting such addition consists in dissolving the anti-oxidant in a suitable solvent and adding the resultant solution to the mixture of water, alkali, and rosin in the reaction vessel in which the saponification reaction is carried out. Thus, for example, about 0.2 per cent of 4,4'-tetramethyldiamino-diphenyl-methane, based on the weight of the rosin employed, may be dissolved in alcohol and added to a mixture of rosin, water, and sodium hydroxide so proportioned as to produce a size containing about 5.0 per cent free rosin, either before or during the saponification reaction. Upon completion of the reaction, the mixture may be desiccated by spray or drum drying to produce a dry size having the anti-oxident uniformly distributed therethrough.

The following table presents comparative data illustrative of the degree of stabilization secured by the use of the preferred anti-oxidants of the present class. In each experiment, approximately 40 parts of gum rosin were saponified with 5 parts of sodium hydroxide in the form of a 39 per cent aqueous solution. When the saponification was about one-half completed, 0.2 part (0.5 per cent based on the weight of rosin) of the anti-oxidant in 3 per cent paraffin oil solution was added to the reaction mixture. Upon completion of the reaction, the mixture was spray-dried to form a dry powder having the anti-oxident uniformly distributed throughout. A sample of the composition so prepared was then tested for ease of oxidation by the 48-hour Mackay test as well as by a standard oxygen demand test in an oxygen absorption train. The oxygen demand is expressed as the per cent by weight oxygen absorbed over a four-hour period.

Table

| Exp't No. | Anti-oxidant | Oxygen demand | Mackay test |
|---|---|---|---|
| | | Percent | |
| 1 | None (control) | 3.79 | Burned in 13 hrs. |
| 2 | 4, 4' - tetramethyldiamino - di - phenyl-methane. | 1.15 | Stable. |
| 3 | 4, 4', 4''-hexamethyltriamino-triphenyl-methane. | 1.52 | Do. |

Other modes of applying the principle of my invention may be employed instead of those explained, change being made as regards the materials employed, provided the ingredients stated by any of the appended claims or the equivalent of such stated ingredients be employed.

This application is a continuation-in-part of my copending application Serial No. 152,194, filed July 6, 1937.

What I claim and desire to protect by Letters Patent is:

1. A stabilized dry size composition comprising saponified rosin and, as an anti-oxidant therefor, a diphenyl-methane derivative of the general formula

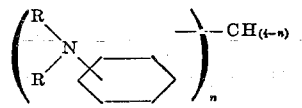

wherein R represents a lower alkyl radical and $n$ represents an integer greater than 1 but less than 4, said diphenyl-methane derivative being present in an amount sufficient to render the composition substantially resistant to oxidation.

2. A stabilized dry size composition comprising saponified rosin, free rosin, and, as an anti-oxidant therefor, a diphenyl-methane derivative of the general formula

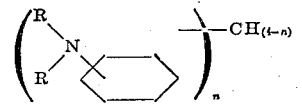

wherein R represents a lower alkyl radical and N represents an integer greater than 1 but less than 4, said diphenyl-methane derivative being present in an amount sufficient to render the composition substantially resistant to oxidation.

3. A stabilized dry size composition comprising saponified rosin and, as an anti-oxidant therefor, 4,4' - tetramethyldiamino - diphenyl-methane in an amount sufficient to render the composition substantially resistant to oxidation.

4. A stabilized dry size composition comprising saponified rosin, free rosin, and, as an anti-oxidant therefor, 4,4'-tetramethyldiamino-diphenyl-methane in an amount sufficient to render the composition substantially resistant to oxidation.

5. A stabilized dry size composition comprising saponified rosin and, as an anti-oxidant therefor, 4,4',4''-hexamethyltriamino-triphenyl-methane in an amount sufficient to render the composition substantially resistant to oxidation.

6. A stabilized dry size composition comprising saponified rosin, free rosin, and, as an anti-oxidant therefor, 4,4',4''-hexamethyltriamino-triphenyl-methane in an amount sufficient to render the composition substantially resistant to oxidation.

ARTHUR C. DRESHFIELD.